(12) United States Patent
Kato et al.

(10) Patent No.: US 9,258,453 B2
(45) Date of Patent: Feb. 9, 2016

(54) IMAGE CAPTURING APPARATUS FOR ENABLING GENERATION OF DATA OF PANORAMIC IMAGE WITH WIDE DYNAMIC RANGE

(75) Inventors: Hiroyuki Kato, Tokyo (JP); Jun Muraki, Tokyo (JP); Hiroshi Shimizu, Tokyo (JP); Hiroyuki Hoshino, Tokyo (JP); Erina Ichikawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 628 days.

(21) Appl. No.: 13/432,919

(22) Filed: Mar. 28, 2012

(65) Prior Publication Data

US 2012/0249728 A1 Oct. 4, 2012

(30) Foreign Application Priority Data

Mar. 31, 2011 (JP) .................................. 2011-078412

(51) Int. Cl.
*H04N 9/68* (2006.01)
*H04N 1/387* (2006.01)
(Continued)

(52) U.S. Cl.
CPC ........... *H04N 1/3871* (2013.01); *H04N 1/3876* (2013.01); *H04N 5/2355* (2013.01); *H04N 5/23238* (2013.01)

(58) Field of Classification Search
CPC .............. H04N 1/3871; H04N 1/3876; H04N 5/23238; H04N 5/2355; G06T 2207/20208; G06T 5/007
USPC ................................. 348/36, E5.037, E9.053
See application file for complete search history.

(56) References Cited

U.S. PATENT DOCUMENTS 5,045,872 A * 9/1991 Yoshimura et al. ............. 396/20
7,239,805 B2 * 7/2007 Uyttendaele et al. ......... 396/222
(Continued)

FOREIGN PATENT DOCUMENTS

JP 11-065004 A 3/1999
JP 2007288805 A 11/2007
(Continued)

OTHER PUBLICATIONS

Chinese Office Action dated Jun. 4, 2014 issued in counterpart Chinese Application No. 201210083685.1.
(Continued)

*Primary Examiner* — Mohammed Rahaman
(74) *Attorney, Agent, or Firm* — Holtz, Holtz & Volek PC (57) ABSTRACT

An image capturing apparatus includes an image capturing section, an image capturing control section, an image clipping section, an HDR composing section and a panoramic image composing section. The image capturing control section causes the image capturing section to repeatedly capture an image of different luminance to provide plural images of different luminance. The image clipping section clips respective data of substantially overlapping image regions of the plural images of different luminance. The HDR composing section composes the image regions each clipped by the image clipping section to generate data of plural composite images having a wider dynamic range than the image captured by the image capturing section. The panoramic image composing section joins data of the plural composite images generated by the HDR composing section to generate an image whose range is wider than that of the image captured by the image capturing section.

12 Claims, 4 Drawing Sheets

(51) Int. Cl.
*H04N 5/232* (2006.01)
*H04N 5/235* (2006.01)

(56) References Cited

U.S. PATENT DOCUMENTS

| | | | |
|---|---|---|---|
| 8,340,453 B1* | 12/2012 | Chen et al. | 382/254 |
| 2002/0097327 A1* | 7/2002 | Yamasaki | 348/239 |
| 2004/0100565 A1* | 5/2004 | Chen et al. | 348/229.1 |
| 2004/0228544 A1* | 11/2004 | Endo et al. | 382/284 |
| 2010/0045815 A1* | 2/2010 | Tsuchiya | 348/222.1 |
| 2011/0007185 A1* | 1/2011 | Yonaha et al. | 348/239 |
| 2012/0002899 A1* | 1/2012 | Orr et al. | 382/282 |
| 2013/0229546 A1 | 9/2013 | Furumura et al. | |

FOREIGN PATENT DOCUMENTS

| | | |
|---|---|---|
| JP | 2010074535 A | 4/2010 |
| JP | 2012080432 A | 4/2012 |

OTHER PUBLICATIONS

Japanese Office Action dated Aug. 5, 2014, issued in counterpart Japanese Application No. 2011-078412.

* cited by examiner

IMAGE CAPTURING APPARATUS FOR ENABLING GENERATION OF DATA OF PANORAMIC IMAGE WITH WIDE DYNAMIC RANGE

This application is based upon and claims the benefit of priority from the prior Japanese Patent Application No. 2011-078412, filed Mar. 31, 2011, the entire contents of which are incorporated herein by reference.

BACKGROUND OF THE INVENTION

1. Field of the Invention

The present invention relates to an image capturing apparatus, an image capturing control method, an image processing apparatus, an image processing method, and a storage medium for enabling the generation of data of a panoramic image with a wide dynamic range.

2. Related Art

Conventionally, technology is known for capturing horizontally long or vertically long images captured over a wider angle of view (i.e., so-called panoramic images) than images captured over a standard angle of view (hereinafter, referred to as "normal images"). While the panoramic images are generally captured with a special wide-angle lens which enables image capturing over a wider angle of view than a normal lens, recent technology enabling the capturing of panoramic images with the normal lens is also known (see, Japanese Unexamined Patent Application, Publication No. H11-65004).

According to Japanese Unexamined Patent Application, Publication No. H11-65004, an image capturing apparatus successively and repeatedly performs an image capturing operation (hereinafter, referred to as "continuous shooting operation") while the apparatus is moved by a user. Thereafter, the image capturing apparatus composes respective data of plural normal images acquired in the continuous shooting operation to generate data of a panoramic image. The data of the panoramic image thus generated is data of a horizontally long or vertically long image formed by joining plural normal images.

However, when data of images with a wide angle of view such as the data of the panoramic image described above is acquired, in high contrast scenery, highlight clipping and shadow clipping occur in light areas and dark areas, respectively.

A technology for solving this problem is disclosed in Japanese Unexamined Patent Application, Publication No. H11-65004.

According to the technology disclosed in Japanese Unexamined Patent Application, Publication No. H11-65004, the image capturing apparatus captures plural normal images over a predetermined moving range in a predetermined exposure amount, and then changes the exposure amount and captures plural normal images again over the same moving range. Thereafter, the image capturing apparatus composes respective data of these plural normal images to generate data of a panoramic image with a wide dynamic range.

Here, the technology disclosed in Japanese Unexamined Patent Application, Publication No. H11-65004, as mentioned above, assumes image capturing twice over the same moving range. Such an assumption requires the exact coincidence of the moving range of the image capturing apparatus, and therefore a rotatable platform for fixing the image capturing apparatus is needed. Thus, if the rotatable platform is unprepared, or if the rotatable platform cannot be stably installed, the acquisition of a panoramic image with a wide dynamic range by applying the technology disclosed in Japanese Unexamined Patent Application, Publication No. H11-65004 is extremely difficult. In the cases mentioned above, the user will hold the image capturing apparatus with hands and move the same, but it is very difficult for the user to move the image capturing apparatus both times over the same moving range.

SUMMARY OF THE INVENTION

It is an object of the present invention to generate data of a panoramic image with a wide dynamic range.

In order to achieve the above-mentioned object, the image capturing apparatus according to a first aspect of the present invention includes an image capturing section; an image capturing control section which repeatedly captures an image of different luminance with the image capturing section to provide plural images of different luminance; an image region clipping section which clips each of substantially overlapping image regions of the plural images of different luminance; a composite image generation section which composes each of the image regions clipped by the image region clipping section to generate plural composite images having a wider dynamic range than that of the image captured by the image capturing section; and a wide range image generation section which joins the plural composite images generated by the composite image generation section to generate an image whose range is wider than that of the image captured by the image capturing section.

DETAILED DESCRIPTION OF THE INVENTION

An embodiment of the present invention will be described below with reference to the drawings.

Figure 1:
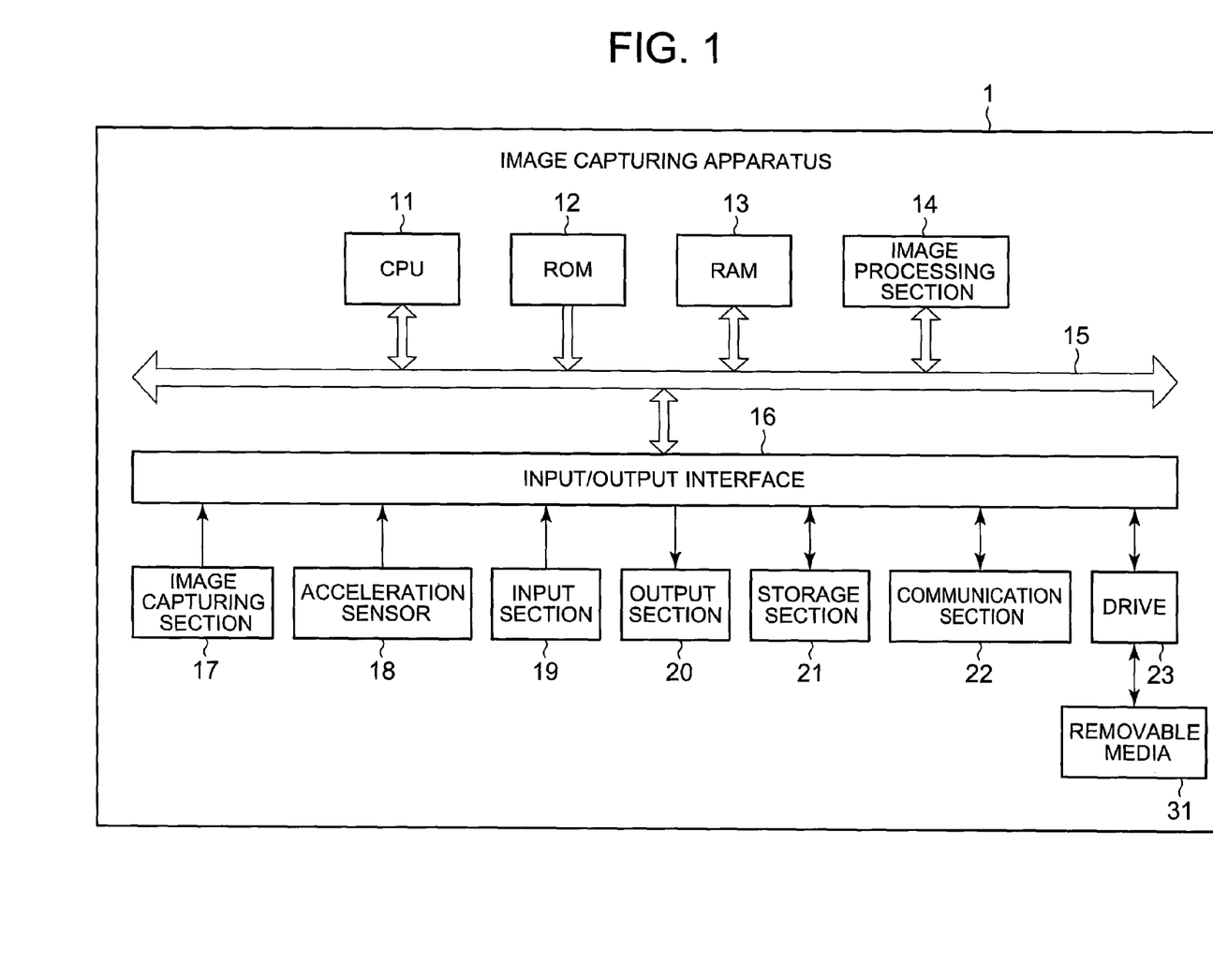
FIG. 1 is a block diagram showing a hardware configuration of an image capturing apparatus according to one embodiment of the present invention.

FIG. 1 is a block diagram showing a hardware configuration of an image capturing apparatus 1 according to one embodiment of the present invention.

The image capturing apparatus 1 is configured as a digital camera, for example.

The image capturing apparatus 1 is provided with a CPU (Central Processing Unit) 11, ROM (Read Only Memory) 12, RAM (Random Access Memory) 13, an image processing section 14, a bus 15, an input/output interface 16, an image capturing section 17, an acceleration sensor 18, an input section 19, an output section 20, a storage section 21, a communication section 22, and a drive 23.

The CPU 11 executes various types of processing according to programs that are recorded in the ROM 12 or programs that are loaded from the storage section 21 to the RAM 13.

The RAM 13 also stores data and the like necessary for the CPU 11 to execute various processes, as appropriate.

The image processing section 14 is configured by a DSP (Digital Signal Processor), VRAM (Video Random Access Memory), and the like, and collaborates with the CPU 11 to execute various kinds of image processing on image data.

The CPU 11, the ROM 12, the RAM 13, and the image processing section 14 are connected to one another via the bus 15. The bus 15 is also connected with the input/output interface 16. The input/output interface 16 is connected to the image capturing section 17, the acceleration sensor 18, the input section 19, the output section 20, the storage section 21, the communication section 22 and the drive 23.

The image capturing section 17 is provided with an optical lens section and an image sensor, which are not illustrated.

In order to photograph a subject, the optical lens section is configured by a lens, e.g., a focus lens that condenses light, a zoom lens or the like.

The focus lens is a lens for forming an image of a subject on the light receiving surface of the image sensor. The zoom lens is a lens for freely changing focal length within a predetermined range.

The optical lens section also includes peripheral circuits to adjust parameters such as focus, exposure amount, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device or the like, for example. Light incident through the optical lens section forms an image of a subject in the optoelectronic conversion device. The optoelectronic conversion device optoelectronically converts (i.e. captures) an image of a subject, accumulates a resultant image signal for a predetermined time interval, and sequentially supplies the accumulated image signal as an analog signal to the AFE.

The AFE executes various kinds of signal processing such as A/D (Analog/Digital) conversion processing of the analog signal, and outputs a resultant digital signal as an output signal from the image capturing section 17.

An output signal output from the image capturing section 17 in a single photographing operation is referred hereinafter to as "data of a frame image". A continuous shooting operation is multiple repetition of an image capturing operation, and plural data of captured images are output from the image capturing section 17 via the continuous shooting operation.

The acceleration sensor 18 detects the velocity and acceleration of the image capturing apparatus 1.

The input section 19 is configured by various buttons or the like, and inputs various types of information in response to an instruction operation of the user.

The output section 20 is configured by a display and a speaker or the like, and outputs images and sound.

The storage section 21 is configured by a hard disc or DRAM (Dynamic Random Access Memory) or the like, and stores data of various images.

The communication section 22 controls communication with other devices (not shown) via a network, which includes the Internet.

Removable media 31 including a magnetic disk, an optical disk, a magneto-optical disk, semiconductor memory, or the like is installed in the drive 23, as appropriate. Programs read via the drive 23 from the removable media 31 are installed in the storage section 21 as necessary. In addition, similarly to the storage section 21, the removable media 31 can also store various kinds of data such as the image data stored in the storage section 21.

The image capturing apparatus 1 having such a configuration can execute panoramic image generating processing.

The panoramic image generating processing is a process sequence in which data of the panoramic image is generated by causing the image capturing section 17 to perform the continuous shooting operation while changing the exposure, and composing data of the resultant plural frame images.

Now, in order to facilitate understanding of the panoramic image generating processing, referring to FIG. 2, the outline of a method of generating data of the panoramic image in the panoramic image generating processing will be described first.

Figure 2:
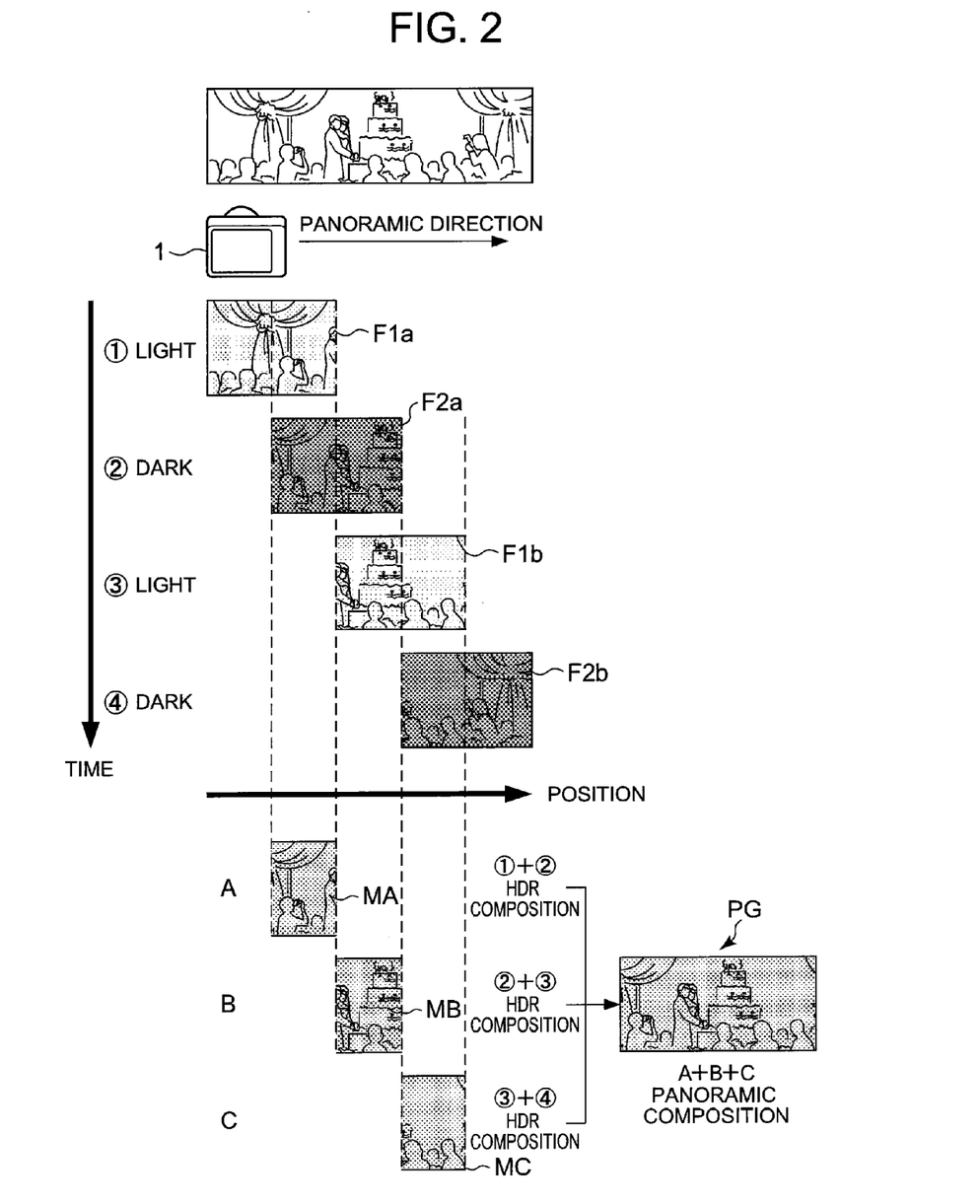
FIG. 2 is a schematic diagram showing an example of generation of a panoramic image.

FIG. 2 is a schematic diagram showing an example of a method of the generation of data of a panoramic image.

In the present embodiment, an explanation will be given by taking as an example a case of capturing an image of a scene in which a cake-cutting ceremony by a bride and groom is performed in a wedding banquet hall during the wedding ceremony.

In the present embodiment, the image capturing apparatus 1 is assumed to be moved in a left-to-right direction in FIG. 2. It should be noted that the direction in which the user moves the image capturing apparatus 1 for the purpose of capturing a panoramic image, i.e., the left-to-right direction in the present embodiment, is referred to as "panoramic direction".

In the present embodiment, the periphery of the cake and of the bride and groom viewed in the center of the field of view is spotlighted and further lit up by the flame of candles in the cake, and the flashlight helping persons at the wedding ceremony to capture an image of the bride and groom, or the like, and is very light. In contrast, locations other than the periphery of the cake and of the bride and groom are unlit and are dark.

Thus, in the present embodiment the target of the image capturing is a scene containing a large difference between light and dark, and an image captured over a wide dynamic range is required.

In addition, while the application of the technology disclosed in Japanese Unexamined Patent Application, Publication No. H11-65004 as mentioned above is intended for the purpose of capturing an image having a wide dynamic range, installation of the rotatable platform, which is required for the application of the technology disclosed in Japanese Unexamined Patent Application, Publication No. H11-65004, may be difficult. Alternatively, even though the user holds the image capturing apparatus 1 with his or her hands and moves the same, it is very difficult to move the image capturing apparatus twice in the same track in the panoramic direction. Therefore, it is not suitable to apply the technology disclosed in Japanese Unexamined Patent Application, Publication No. H11-65004 described above on such an occasion.

On the other hand, in the present embodiment, it is preferable for the user to employ the image capturing apparatus 1 of the present embodiment, since the user can easily acquire a panoramic image with a wide dynamic range and a natural seam between the frame images by holding the image capturing apparatus 1 of the present embodiment with his or her hands and moving the same only once in the panoramic direction, as described later.

Schematically, while being moved in the panoramic direction by the user, the image capturing apparatus 1, sets a first exposure condition (for example, an exposure condition for acquiring a light frame image) and a second exposure condition (for example, an exposure condition for acquiring a dark frame image) in the image capturing section 17, and, while switching them, performs the continuous shooting operation. This produces respective data of a number of frame images captured under the first exposure condition (hereinafter, referred to as "first exposure amount frame image"), as well as respective data of a number of frame images captured under the second exposure condition between the first exposure amount frame images.

The image capturing apparatus 1 utilizes, as a target to be processed, a set of the first exposure amount frame image and the second exposure amount frame image which have been sequentially captured, or a set of the second exposure amount frame image and the first exposure amount frame image which have been sequentially captured. The image capturing apparatus 1 separately extracts data of the image regions captured over the same range from respective data of the set to be processed, and superimposingly composes respective data of the set. For each set, this produces data of a composite image, i.e., data of a composite image with a wide dynamic range (hereinafter, referred to as "HDR composite image"), in which the images over the same range, each captured under different first exposure condition and second exposure condition, are composed.

The image capturing apparatus 1 can generate data of the panoramic image with a wide dynamic range and a natural seam between the frame images, by composing respective data of the HDR composite images for each set so as to join the same in the panoramic direction in order of image capturing.

More specifically, the user performs an operation of pressing a shutter button (not shown) of the input section 19 to the lower limit (hereinafter, referred to as "full press operation"), while holding the image capturing apparatus 1. This triggers the panoramic image generating processing, and the image capturing apparatus 1 causes the image capturing section 17 to start the continuous shooting operation.

Next, the user moves the image capturing apparatus 1 in the panoramic direction, while maintaining full press operation of the shutter button. Such a movement is generally expressed as "panning".

During the movement, the image capturing apparatus 1 detects a moving distance based on the detection result of the acceleration sensor 18, and every time the moving distance has reached a predetermined amount, the image capturing apparatus 1 switches the exposure condition to other exposure conditions different from the last exposure condition and causes the image capturing section 17 to capture an image of a subject. The image capturing apparatus 1 stores data of the resultant frame image. This process sequence is repeated.

More specifically, in the present embodiment the image capturing apparatus 1 first sets a first exposure condition, then performs first image capturing, and then store data of a first exposure amount frame image F1a.

Subsequently, when a moving distance from the position at the time of the first image capturing has reached the predetermined amount, the image capturing apparatus 1 switches the exposure condition to a second exposure condition, then performs second image capturing, and then stores data of a second exposure amount frame image F2a.

The image capturing apparatus 1 superimposingly composes respective data of overlapping portions of the first exposure amount frame image F1a and the second exposure amount frame image F2a (a right half portion of the first exposure amount frame image F1a and a left half portion of the second exposure amount frame image F2a) to generate data of an HDR composite image MA. It should be noted that, in order to distinguish such a composition from the composition at the time of the panoramic image generation, the former is referred hereinafter to as "HDR composition". In the present embodiment, the overlapping portions can be a pair of partial images (for example, the right half portion of the first exposure amount frame image F1a and the left half portion of the second exposure amount frame image F2a) each obtained by subtracting an image region associated with the predetermined moving distance detected by the acceleration sensor 18 from either of the images to be composed (for example, the first exposure amount frame image F1a and the second exposure amount frame image F2a), as described above. In each of subsequent image capturing steps, the overlapping portions can be selected in a similar manner.

Thereafter analogously, when a moving distance from the position at the time of the second image capturing has reached the predetermined amount, the image capturing apparatus 1 again switches the exposure condition to the first exposure condition, then performs third image capturing, and then stores data of another first exposure amount frame image F1b.

The image capturing apparatus 1 performs an HDR composition of respective data of overlapping portions of the second exposure amount frame image F2a and the first exposure amount frame image F1b (a right half portion of the second exposure amount frame image F2a and a left half portion of the first exposure amount frame image F1b) to generate data of an HDR composite image MB.

Furthermore, when a moving distance from the position at the time of the third image capturing has reached the predetermined amount, the image capturing apparatus 1 switches the exposure condition to the second exposure condition, then performs fourth image capturing, and then stores data of another second exposure amount frame image F2b.

Thereafter image capturing apparatus 1 performs the HDR composition of respective data of overlapping portions of the first exposure amount frame image F1b and the second exposure amount frame image F2b (a right half portion of the first exposure amount frame image F1b and a left half portion of the second exposure amount frame image F2b) to generate data of an HDR composite image MC.

Thereafter total amount of the moving distance (an accumulative moving distance from the position where the full press operation is started) has reached a predefined amount, the image capturing apparatus 1 ends the continuous shooting operation of the image capturing section 17.

At this point, the image capturing apparatus 1 composes respective data of the HDR composite images MA to MC generated previously so as to join the same in the panoramic direction in order of image capturing to generate data of a panoramic image PG.

As seen from the above, the HDR composite images MA to MC are composite images in which the images captured under a different first exposure condition or second exposure condition are additively composed by changing a composing ratio as a function of a histogram distribution state, and have the same level wide dynamic range. Consequently, the panoramic image PG composed so as to join such HDR composite images MA to MC is a panoramic image having a natural seam between the frame images and a wide dynamic range.

Next, referring to FIG. 3, the functional configuration of the image capturing apparatus 1 for performing such panoramic image generating processing and panoramic image outline display processing will be described.

Figure 3:
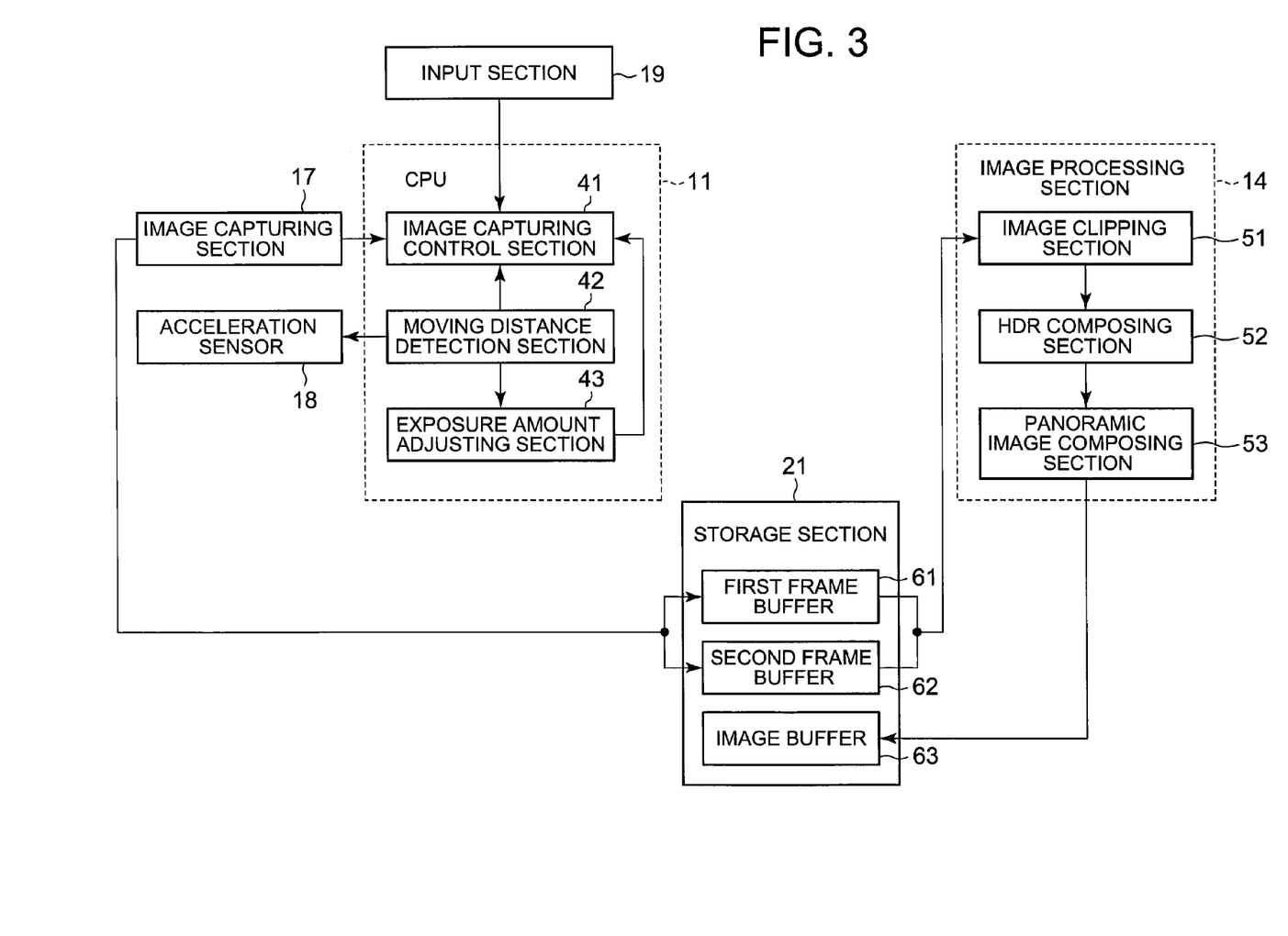
FIG. 3 is a functional block diagram showing a functional configuration for executing panoramic image generating processing from among functional configurations of the image capturing apparatus shown in FIG. 1.

FIG. 3 is a functional block diagram showing the functional configuration for executing the panoramic image generating processing from among the functional configurations of the image capturing apparatus 1 shown in FIG. 1.

When the image capturing apparatus 1 executes the panoramic image generating processing, in the CPU 11, an image capturing control section 41, a moving distance detection section 42 and an exposure amount adjusting section 43 operate. In the image processing section 14, an image clipping section 51, an HDR composing section 52 and a panoramic image composing section 53 operate.

Furthermore, in the storage section 21, each of the three divided region operates as a first frame buffer 61 that stores data of the first exposure amount frame images, a second frame buffer 62 that stores data of the second exposure amount frame images, and an image buffer 63 that stores data of the panoramic image, respectively.

The image capturing control section 41 controls timing of the image capturing of the image capturing section 17 and switching of the exposure amount.

More specifically, when the user performs the full press operation while holding the image capturing apparatus 1, the panoramic image generating processing starts. More specifically, the image capturing control section 41 starts the continuous shooting operation of the image capturing section 17.

Thereafter, the user moves the image capturing apparatus 1 in the panoramic direction, while keeping the full press operation of a shutter switch.

While the full press operation is maintained, every time a moving distance of the image capturing apparatus 1 (the moving distance will be described later) has reached the predetermined amount, the image capturing control section 41 switches the exposure amount based on the adjustment result of the exposure amount adjusting section 43 (which will be described later), and causes the image capturing section 17 to capture an image. The image capturing control section 41 temporarily stores data of the resultant first exposure amount frame image or second exposure amount frame image in the first frame buffer 61. The image capturing control section 41 repeats this sequence of processes.

Thereafter, when the total moving distance of the image capturing apparatus 1 has reached the predefined amount, the image capturing control section 41 ends the continuous shooting operation of the image capturing section 17.

The moving distance detection section 42 detects a moving distance or an acceleration of the image capturing apparatus 1 based on the detection result of the acceleration sensor 18.

The exposure amount adjusting section 43 adjusts the exposure condition to be set to the image capturing section 17 (in the present embodiment, the first exposure condition or the second exposure condition) based on the moving distance of the image capturing apparatus 1 detected by the moving distance detection section 42, and notifies the adjustment result to the image capturing control section 41.

Under control of the CPU 11 having this functional configuration, when the data of the first exposure amount frame image is output from the image capturing section 17, the data is stored in the first frame buffer 61. On the other hand, when the data of the second exposure amount frame image is output from the image capturing section 17, the data is stored in the second frame buffer.

The image clipping section 51 clips data of a first region of the first exposure amount frame image from the first frame buffer 61, and clips data of a second region associated with the first region from the second exposure amount frame image data.

The HDR composing section 52 performs the HDR composition of respective data of the first region (a part of a frame image captured under a light first exposure amount) and the second region (a part of a frame image captured under a dark second exposure amount) each clipped by the image clipping section 51, to generate data of the HDR composite image.

The panoramic image composing section 53 composes the data of plural HDR composite images generated by the HDR composing section 52 so as to join the same to generate the data of a panoramic image, and causes the image buffer 63 to store the data of the panoramic image.

Figure 4:
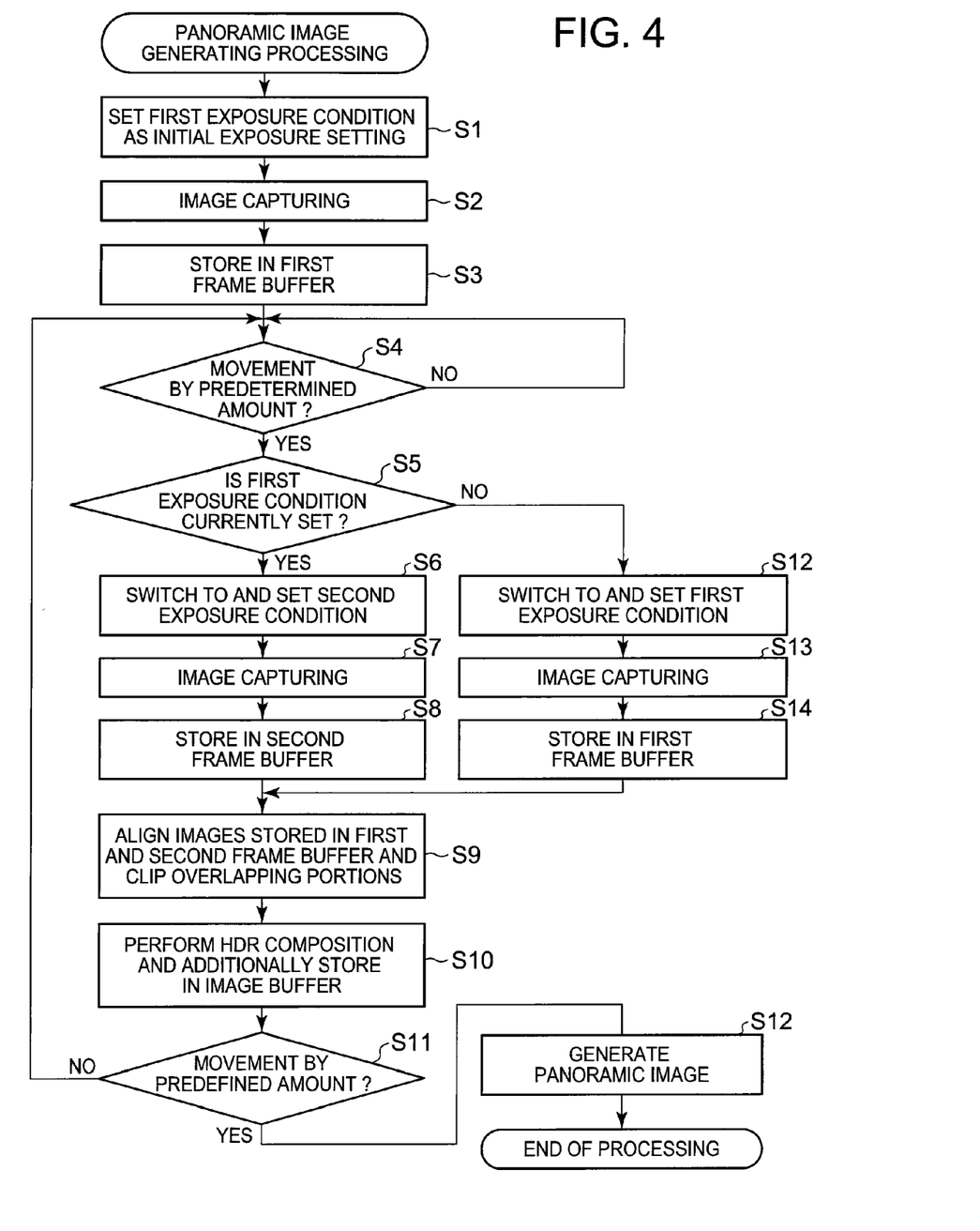
FIG. 4 is a flowchart illustrating flow of panoramic image generating processing executed by the image capturing apparatus shown in FIG. 1 having the functional configuration shown in FIG. 2.

Next, from among the processes executed by the image capturing apparatus 1 shown in FIG. 1 having the functional configuration shown in FIG. 3, flow of the panoramic image generating processing will be described with reference to FIG. 4. FIG. 4 is a flowchart illustrating the flow of the panoramic image generating processing executed by the image capturing apparatus 1.

In the present embodiment, the panoramic image generating processing is started when the user performs the full press operation of the shutter button (not shown) of the input section 19 to instruct the image capturing.

In Step S1, the exposure amount adjusting section 43 first sets the first exposure condition as an initial exposure amount setting.

In Step S2, the image capturing control section 41 causes the image capturing section 17 to capture a first exposure amount frame image (for example, the first exposure amount frame image F1a shown in FIG. 2) under the first exposure condition.

In Step S3, the image capturing control section 41 causes the first frame buffer 61 to store data of the first exposure amount frame image captured and output by the image capturing section 17 in the process of Step S2.

During this process sequence, the angle of view captured by the image capturing apparatus 1 is moved in a predetermined direction (the panoramic direction) by the user.

In Step S4, the moving distance detection section 42 determines whether or not the image capturing apparatus 1 has moved by a predetermined amount, in other words, whether or not a moving distance from the position at the time of the last image capturing (at the time of the last Step S2, S7, or S13) has reached the predetermined amount.

If the moving distance has not reached the predetermined amount, in Step S4, a determination of NO is made, and the processing returns again to the processing of Step S4. This means that, until the moving distance has reached the predetermined amount, the determination processing in Step S4 is repeatedly executed, and the panoramic image generating processing enters a standby state.

Thereafter, when the moving distance has reached the predetermined amount, in Step S4, a determination of YES is made, and the processing proceeds to Step S5.

In Step S5, the exposure amount adjusting section 43 determines whether or not the first exposure condition is currently set.

For example, in the processing in Step S5, which is performed after the first image capturing in the processing in Step S2, since the first image capturing is performed under the setting of the first exposure condition, a determination of YES is made in Step S5, and the processing proceeds to Step S6.

In Step S6, the exposure amount adjusting section 43 switches the exposure condition from the first exposure condition to the second exposure condition and sets the exposure condition accordingly. In other words, the setting of the exposure amount is switched from the first exposure condition to the second exposure condition.

In Step S7, the image capturing control section 41 causes the image capturing section 17 to capture one second exposure amount frame image under the dark second exposure condition. For example, if it is the second image capturing, the second exposure amount frame image F2a shown in FIG. 2 is captured.

In Step S8, the image capturing control section 41 causes the second frame buffer 62 to store data of the second exposure amount frame image captured and output by the image capturing section 17 in the processing of Step S7.

In Step S9, the image clipping section 51 properly aligns the images stored in the first frame buffer 61 and the second frame buffer 62 and clips data of overlapping portions.

More specifically, the image clipping section 51 clips the data of the overlapping portions of the first exposure amount frame image captured under the first exposure condition, which is stored in the first frame buffer 61, and the second exposure amount frame image captured under the second exposure condition, which is stored in the second frame buffer 62.

In Step S10, the HDR composing section 52 performs the HDR composition of each of the overlapping portions clipped from each of the first exposure amount frame image and the second exposure amount frame image in the processing of Step S9 to generate the data of the HDR composite image. After the HDR composition, the HDR composing section 52 causes the image buffer 63 to additionally store the data of the HDR composite image (not shown in FIG. 3).

For example, it is assumed that in the processing of Step S9, each of the overlapping portions of the first exposure amount frame image F1*a* acquired by the first image capturing and the second exposure amount frame image F2*a* acquired by the second image capturing, as shown in FIG. 2, i.e., each of a right half portion of the first exposure amount frame image F1*a* and a left half portion of the second exposure amount frame image F2*a* is clipped.

In this case, in the processing of Step S10, the right half portion of the first exposure amount frame image F1*a* and the left half portion of the second exposure amount frame image F2*a* are subjected to the HDR composition. Then, data of the HDR composite image MA is generated and additionally stored in the image buffer 63.

In Step S11, the moving distance detection section 42 determines whether or not the image capturing apparatus 1 has moved by the predefined amount, in other words, whether or not the accumulative total moving distance has reached the predefined amount.

If the total moving distance has reached the predefined amount, then in Step S11 a determination of YES is made, and the processing proceeds to Step S12. The processing of the steps after Step S12 will be described later.

On the other hand, if the total moving distance has not reached the predetermined amount, then in Step S11 a determination of NO is made, and the processing returns to the processing of Step S4, and the processing in Steps S4 to S10 is repeated.

More specifically, it is assumed that after the first image capturing under the light first exposure condition is performed in the processing of Step S2, Steps S4 to S6 are executed, the second image capturing under the dark second exposure condition is performed in the processing of Step S7, Steps S8 to S10 are executed, and the data of the HDR composite image MA shown in FIG. 2 is stored in the image buffer 63.

In this case, if it is determined in the processing of Step S4 that the image capturing apparatus 1 has moved by the predetermined amount, then a determination of NO is made in Step S5 since the second image capturing was performed under the dark second exposure condition, and the processing proceeds to Step S12.

In Step S12, the exposure amount adjusting section 43 switches the exposure condition from the second exposure condition to the first exposure condition and sets the exposure condition accordingly. In other words, the exposure condition switches from the second exposure condition to the first exposure condition.

In Step S13, the image capturing control section 41 causes the image capturing section 17 to capture one first exposure amount frame image under the light first exposure condition. For example, since this is the third image capturing, the first exposure amount frame image F1*b* shown in FIG. 2 is captured.

In Step S14, the image capturing control section 41 causes the first frame buffer 61 to store data of the first exposure amount frame image captured and output by the image capturing section 17 in the processing of Step S13.

Thereafter, in the processing of Step S9 each overlapping portion of the second exposure amount frame image F2*a* acquired by the second image capturing and the first exposure amount frame image F1*b* acquired by the third image capturing, as shown in FIG. 2, i.e., each of the right half portion of the second exposure amount frame image F2*a* and the left half portion of the first exposure amount frame image F1*b*, is clipped.

In this case, in the processing of Step S10, the right half portion of the second exposure amount frame image F2*a* and the left half portion of the first exposure amount frame image F1*b* are subject to the HDR composition. Thereafter, the data of the HDR composite image MB is generated and additionally stored in the image buffer 63.

Thereafter, in Step S11, a determination of NO is made, the processing returns to Step S4, and the processing in Steps S4 to S10 is repeated.

More specifically, if it has been determined in the processing of Step S4 that the image capturing apparatus 1 has moved by the predetermined amount, then a determination of YES is made in Step S5 since the third image capturing was performed under the first exposure condition, and the processing proceeds to Step S6.

In the processing of Step S6, the exposure condition is switched to the second exposure condition and set accordingly, a fourth image capturing is performed in the processing of Step S7, and the second exposure amount frame image F2*b* shown in FIG. 2 is stored in the second frame buffer 62 in the processing of Step S8.

Thereafter, in the processing of Step S9, each overlapping portion of the first exposure amount frame image F1*b* acquired in the third image capturing and the second exposure amount frame image F2*b* acquired in the fourth image capturing, as shown in FIG. 2, is clipped, i.e., each of the right half portion of the first exposure amount frame image F1*b* and the left half portion of the second exposure amount frame image F2*b* is clipped.

In this case, in the processing of Step S10, the right half portion of the first exposure amount frame image F1*b* and the left half portion of the second exposure amount frame image F2*b* are subjected to the HDR composition. Thereafter, data of the HDR composite image MC is generated, and is additionally stored in the image buffer 63.

If the total moving distance has reached the predetermined amount, a determination of YES is made in Step S11 and the processing proceeds to Step S12.

In Step S12, the panoramic image composing section 53 composes the data of the HDR composite images previously generated so as to join the same in the panoramic direction in order of generating, to generate the data of the panoramic image. For example, as shown in FIG. 2, respective data of the HDR composite images MA to MC is composed, and the data of the panoramic image is generated.

At this point, the panoramic image generating processing ends.

Thus, in the present embodiment, the image capturing apparatus 1 can execute the panoramic image generating processing according to the flowchart shown in FIG. 4 and thereby generate the panoramic image with a wide dynamic range by a single photographing operation.

As described above, the image capturing apparatus 1 includes the image capturing section 17, the image capturing control section 41, and the HDR composing section 52.

The image capturing control section 41 controls the image capturing section 17 so as to repeatedly capture a frame image under different exposure conditions to provide plural images of different luminance.

The HDR composing section 52 performs the HDR composition of respective data of substantially overlapping image regions of plural frame images acquired by the image capturing control section 41 to generate data of plural HDR composite images having a wider dynamic range than the image acquired in the image capturing performed by the image capturing section.

The panoramic image composing section 53 joins the data of plural HDR composite images generated by the HDR composing section 52 to generate a panoramic image whose range is wider than that of the image captured through the angle of view of the image capturing section 17 (hereinafter, also referred to as "wide-range image").

Consequently, the image capturing apparatus 1 can generate the data of the panoramic image with a wide dynamic range by a single photographing operation.

The image capturing control section 41 can control the image capturing section 17 according to a predetermined algorithm instructing the switching of the image capturing under the first exposure condition and the image capturing under the second exposure condition different from the first exposure condition.

Furthermore, the image capturing control section 41 can control the image capturing section 17 so as to repeatedly capture an image of different luminance in accordance with an algorithm instructing the alternate switching of the exposure amount value at a predetermined time interval.

Thus, the image capturing apparatus 1 can generate data of a panoramic image having a homogenized exposure amount.

The image capturing control section 41 can control the image capturing section 17 so as to repeatedly capture an image of different luminance, in accordance with an algorithm instructing the alternate switching of the exposure amount value at a predetermined moving distance interval or a predetermined rotation angle interval of the image capturing apparatus 1.

Accordingly, the image capturing apparatus 1 can determine the amount of the movement of the image capturing apparatus 1 based on the moving distance interval or the rotation angle interval. Therefore, the image capturing apparatus 1 can control so that the image capturing is performed based on actual movement of the image capturing apparatus 1; consequently, it is possible to capture images so that their substantially overlapping image regions are accurately acquired.

It should be noted that the present invention is not limited to the embodiment described above, and any modifications and improvements thereto within a scope that can realize the object of the present invention are included in the present invention.

Although the image capturing is started from the first exposure condition in the embodiment described above, the present invention is not limited thereto, and the image capturing may be started from the second exposure condition.

In other words, it is only necessary to acquire the frame image of different luminance by changing the exposure condition in accordance with a predetermined algorithm. Although an algorithm instructing the alternate switching of the first exposure condition and the second exposure condition is employed as the predetermined algorithm in the embodiment described above, the present invention is not limited thereto, and any algorithm can be employed.

For example, a similar effect can be realized even if two gain adjustment amounts with respect to the luminance after the image capturing are provided instead of the exposure condition and an algorithm instructing the alternate switching of them is employed. In this case, reduction of the subject blurring stemmed from changing shutter speed is indirectly possible, since the exposure condition is not changed at all.

Furthermore, in the embodiment described above, the data of the HDR composite image is immediately generated in a state in which the data of the frame images of different exposure amount each having substantially overlapping image regions has been acquired, in other words, in a state in which the generation of the data of the HDR composite images has been rendered possible. However, timing of the generation of the data of the HDR composite images is not limited thereto. For example, the image capturing apparatus 1 may generate data of all HDR composite images at the time of the completion of the image capturing of data of all frame images.

Furthermore, although the movement of the image capturing apparatus is determined by means of the moving distance detected by the moving distance detection section 42 in the embodiment described above, the present invention is not limited thereto. It is only necessary to determine the movement of the image capturing apparatus; for example, the movement of the image capturing apparatus may be determined by determining a time period derived from the expected velocity, in other words, by determining the timing of the image capturing based on the time period.

In the image capturing apparatus 1 which determines the movement thereof based on the time period as described just above, the image capturing control section 41 controls the image capturing section 17 so as to synchronously capture images under different exposure conditions at a predetermined time interval.

In this case, the panoramic image can be generated based on a simple configuration lacking, for example, means for detecting the movement of the image capturing apparatus 1, since in such an image capturing apparatus 1 the extent of the movement of the image capturing apparatus 1 is determined based on the time period.

Furthermore, although the image capturing apparatus 1 uses the data of the frame images captured by the image capturing section 17 included therein to generate the data of the panoramic image in the embodiment described above, the present invention is not limited thereto. For example, the image capturing apparatus 1 may use the data of the image captured by an external device to generate the panoramic image.

In other words, in this case, an embodiment of the present invention does not necessarily assume the form of the image capturing apparatus 1 having an image capturing function, and may assume a form of an image processing apparatus which performs only image processing.

Such an image processing apparatus includes an image acquiring section, an image composing section, and an image generation section.

The image acquiring section acquires data of plural images of different exposure amounts from the external device via a communication section or the like.

The image composing section composes respective data of substantially overlapping image regions of these plural images to generate data of plural composite images.

The image generation section joins the data of the plural composite images generated by the image composing section to generate data of a wide-range image (panoramic image) as if captured over a wider range than that of the image captured through the angle of view of a predetermined image capturing section (an image capturing section of the external device, or the like).

Consequently, the image processing apparatus can generate the data of the panoramic image with a wide dynamic range based on the data of the image acquired from the external device. In this case, the user manipulating the external device or any other image capturing apparatus may also capture images by a single photographing operation, as is the case with the user who manipulates the image capturing apparatus 1.

Furthermore, the image capturing apparatus 1 such as a digital camera has been described in the aforementioned embodiment as an example of the electronic apparatus to which the present invention is applied, but the present invention is not particularly limited thereto.

For example, the present invention can generally be applied to any electronic device having a panoramic image outline display processing function. More specifically, for example, the present invention can be applied to a laptop personal computer, a printer, a television receiver, a video camera, a portable navigation device, a cell phone device, a portable game device, and the like.

The processing sequence described above can be executed by hardware, and also can be executed by software.

In other words, the hardware configuration shown in FIG. 2 is merely an illustrative example and the present invention is not particularly limited thereto. More specifically, the types of functional blocks employed to realize the above-described functions are not particularly limited to the example of FIG. 2, so long as the image capturing apparatus 1 can be provided with the functions enabling the aforementioned processing sequence to be executed in its entirety.

A single functional block may be configured by a single piece of hardware, a single installation of software, or any combination thereof.

In a case in which the processing sequence is to be executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable media 31 shown in FIG. 1 distributed separately from the device main body for supplying the program to a user, but also can be constituted by a storage medium or the like supplied to the user in a state incorporated in the device main body in advance. The removable media 31 is composed of a magnetic disk (including a floppy disk), an optical disk, a magnetic optical disk, or the like, for example. The optical disk is composed of a CD-ROM (Compact Disk-Read Only Memory), a DVD (Digital Versatile Disk) or the like, for example. The magnetic optical disk is composed of an MD (Mini-Disk) or the like. The storage medium supplied to the user in a state incorporated in the device main body in advance may include the ROM 12 shown in FIG. 1, a hard disk contained in the storage section 21 shown in FIG. 1 or the like in which the program is recorded, for example.

It should be noted that, in the present specification, the steps describing the program recorded in the storage medium include not only the processing executed in a time series following this order, but also processing executed in parallel or individually, which is not necessarily executed in a time series.

Thus, a number of embodiments of the present invention have been described, but the embodiments described above are merely illustrative examples, and do not limit a technical scope of the present invention. The present invention may be realized as various embodiments other than those specifically set out and described above, and furthermore, a variety of modifications including omissions, substitutions or the like may be made thereto without departing from the spirit of the present invention. These embodiments and modifications thereof are intended to be included in the scope and spirit of present invention set forth in the present specification as well as in the claimed invention and equivalents thereof.

What is claimed is:

1. An image capturing apparatus, comprising:
a processor; and
an image capturing section which comprises an image sensor, and which, under control of the processor, sequentially outputs plural pieces of image data, wherein the plural pieces of the image data are captured in a single continuous shooting operation during which the image capturing section is moved in a predetermined panoramic direction, and wherein adjacent pieces of the captured image data which are adjacent to each other in the predetermined panoramic direction each include corresponding overlapping regions which are captured over a same range in the predetermined panoramic direction, such that one piece of the image data includes (i) a first overlapping region which overlaps a second overlapping region of a preceding adjacent piece of the image data, wherein the first overlapping region of the one piece of the image data and the second overlapping region of the preceding adjacent piece of the image data are captured over a first range in the predetermined panoramic direction, and (ii) a second overlapping region which overlaps a first overlapping region of a succeeding adjacent piece of the image data, wherein the second overlapping region of the one piece of the image data and the first overlapping region of the succeeding adjacent piece of the image data are captured over a second range in the predetermined panoramic direction;
wherein the processor is further configured to perform control to realize functions of:
a control section which performs control to change, at predetermined timings in the single continuous shooting operation, luminances of the plural pieces of the image data such that the adjacent pieces of the image data which are adjacent to each other have respective different luminances;
a specification section which specifies, for the adjacent pieces of the image data, plural sets of corresponding overlapping regions of the adjacent pieces of the image data as targets for composite processing, wherein said plural sets include a first set comprising the first overlapping region of the one piece of the image data and the corresponding second overlapping region of the preceding adjacent piece of the image data, and a second set comprising the second overlapping region of the one piece of image data and the corresponding first overlapping region of the succeeding adjacent piece of the image data, and wherein, in each of the plural sets, the first and second overlapping regions have respective different luminances;
and
a panoramic image composing section which combines the plural sets of the corresponding overlapping regions into a piece of panoramic image data.

2. The image capturing apparatus according to claim 1, wherein the control section controls the image capturing section in accordance with an algorithm instructing switching of image capturing under a first exposure condition and image capturing under a second exposure condition, wherein the image captured under the second exposure condition has a luminance different from the image captured under the first exposure condition.

3. The image capturing apparatus according to claim 2, wherein the processor is further configured to perform control to realize functions of:
   a detection section which detects a moving distance of the image capturing apparatus; and
   a moving distance determination section which determines whether or not the moving distance detected by the detection section has reached a predetermined amount;
   wherein when it is determined that the moving distance has not reached the predetermined amount, the control section sets the first exposure condition, and when it is determined that the moving distance has reached the predetermined amount, the control section sets the second exposure condition.

4. The image capturing apparatus according to claim 1, wherein the control section performs control to change luminance of the plural pieces of image data to be output by the image capturing section in accordance with an algorithm instructing alternate switching of an exposure amount value at a predetermined time interval.

5. The image capturing apparatus according to claim 1, wherein the control section performs control to switch an exposure amount value at a predetermined moving distance interval or a predetermined rotation angle interval of the image capturing apparatus.

6. The image capturing apparatus according to claim 1, wherein the control section performs control to switch two gain adjustment amounts with respect to the images to be repeatedly captured by the image capturing section.

7. The image capturing apparatus according to claim 1, wherein the processor is further configured to perform control to realize a function of:
   a wide dynamic range composing section which performs wide dynamic range composite processing on each of the plural sets of the corresponding overlapping regions which are included in the piece of panoramic image data.

8. A method of controlling image capturing of an image capturing apparatus comprising an image capturing section which includes an image sensor, the method comprising:
   sequentially outputting, with the image capturing section, plural pieces of image data, wherein the plural pieces of the image data are captured in a single continuous shooting operation during which the image capturing section is moved in a predetermined panoramic direction, and wherein adjacent pieces of the captured image data which are adjacent to each other in the predetermined panoramic direction each include corresponding overlapping regions which are captured in a same range in the predetermined panoramic direction, such that one piece of the image data includes (i) a first overlapping region which overlaps a second overlapping region of a preceding adjacent piece of the image data, wherein the first overlapping region of the one piece of the image data and the second overlapping region of the preceding adjacent piece of the image data are captured over a first range in the predetermined panoramic direction, and (ii) a second overlapping region which overlaps a first overlapping region of a succeeding adjacent piece of the image data, wherein the second overlapping region of the one piece of the image data and the first overlapping region of the succeeding adjacent piece of the image data are captured over a second range in the predetermined panoramic direction;
   performing control to change, at predetermined timings in the single continuous shooting operation, luminances of the plural pieces of the image data such that the adjacent pieces of the image data which are adjacent to each other have respective different luminances;
   specifying, for the adjacent pieces of the image data, plural sets of corresponding overlapping regions of the adjacent pieces of the image data as targets for composite processing, wherein said plural sets include a first set comprising the first overlapping region of the one piece of the image data and the corresponding second overlapping region of the preceding adjacent piece of the image data, and a second set comprising the second overlapping region of the one piece of image data and the corresponding first overlapping region of the succeeding adjacent piece of the image data, and wherein, in each of the plural sets, the first and second overlapping regions have respective different luminances;
   and
   combining the plural sets of the corresponding overlapping regions into a piece of panoramic image data.

9. A non-transitory computer readable storage medium having stored therein a program that is executable by a computer that controls an image capturing apparatus which comprises an image capturing section including an image sensor, the program being executable by the computer to cause the computer to function as:
   a control section which controls the image capturing section to sequentially output plural pieces of image data, wherein the plural pieces of the image data are captured in a single continuous shooting operation during which the image capturing section is moved in a predetermined panoramic direction, and wherein adjacent pieces of the captured image data which are adjacent to each other in the predetermined panoramic direction each include corresponding overlapping regions which are captured over a same range in the predetermined panoramic direction, such that one piece of the image data includes (i) a first overlapping region which overlaps a second overlapping region of a preceding adjacent piece of the image data, wherein the first overlapping region of the one piece of the image data and the second overlapping region of the preceding adjacent piece of the image data are captured over a first range in the predetermined panoramic direction, and (ii) a second overlapping region which overlaps a first overlapping region of a succeeding adjacent piece of the image data, wherein the second overlapping region of the one piece of the image data and the first overlapping region of the succeeding adjacent piece of the image data are captured over a second range in the predetermined panoramic direction, and wherein the control section performs control to change, at predetermined timings in the single continuous shooting operation, luminances of the plural pieces of the image data such that the adjacent pieces of the image data which are adjacent to each other have respective different luminances;

a specification section which specifies, for the adjacent pieces of the image data, plural sets of corresponding overlapping regions of the adjacent pieces of the image data as targets for composite processing, wherein said plural sets include a first set comprising the first overlapping region of the one piece of the image data and the corresponding second overlapping region of the preceding adjacent piece of the image data, and a second set comprising the second overlapping region of the one piece of image data and the corresponding first overlapping region of the succeeding adjacent piece of the image data, and wherein, in each of the plural sets, the first and second overlapping regions have respective different luminances;

and a panoramic image composing section which combines the plural sets of the corresponding overlapping regions into a piece of panoramic image data.

10. An image processing apparatus, comprising:

a processor which is configured to perform control to realize functions of:

an image acquiring section which acquires plural pieces of image data sequentially output by an image capturing section comprising an image sensor, luminances of the plural pieces of the image data being changed at predetermined timings such that adjacent pieces of the image data which are adjacent to each other have respective different luminances, wherein the plural pieces of image data are captured in a single continuous shooting operation during which the image capturing section is moved in a predetermined panoramic direction, and wherein adjacent pieces of the captured image data which are adjacent to each other in the predetermined panoramic direction each include corresponding overlapping regions which are captured over a same range in the predetermined panoramic direction, such that one piece of the image data includes (i) a first overlapping region which overlaps a second overlapping region of a preceding adjacent piece of the image data, wherein the first overlapping region of the one piece of the image data and the second overlapping region of the preceding adjacent piece of the image data are captured over a first range in the predetermined panoramic direction, and (ii) a second overlapping region which overlaps a first overlapping region of a succeeding adjacent piece of the image data, wherein the second overlapping region of the one piece of the image data and the first overlapping region of the succeeding adjacent piece of the image data are captured over a second range in the predetermined panoramic direction;

a specification section which specifies, for the adjacent pieces of the image data, plural sets of corresponding overlapping regions of the adjacent pieces of the image data as targets for composite processing, wherein said plural sets include a first set comprising the first overlapping region of the one piece of the image data and the corresponding second overlapping region of the preceding adjacent piece of the image data, and a second set comprising the second overlapping region of the one piece of image data and the corresponding first overlapping region of the succeeding adjacent piece of the image data, and wherein, in each of the plural sets, the first and second overlapping regions have respective different luminances;

and a panoramic image composing section which combines the plural sets of the corresponding overlapping regions into a piece of panoramic image data.

11. An image processing method for an image processing apparatus, the method comprising:

acquiring plural pieces of image data sequentially output by an image capturing section comprising an image sensor, luminances of the plural pieces of the image data being changed at predetermined timings such that adjacent pieces of the image data which are adjacent to each other have respective different luminances, wherein the plural pieces of image data are captured in a single continuous shooting operation during which the image capturing section is moved in a predetermined panoramic direction, and wherein adjacent pieces of the captured image data which are adjacent to each other in the predetermined panoramic direction each include corresponding overlapping regions which are captured over a same range in the predetermined panoramic direction, such that one piece of the image data includes (i) a first overlapping region which overlaps a second overlapping region of a preceding adjacent piece of the image data, wherein the first overlapping region of the one piece of the image data and the second overlapping region of the preceding adjacent piece of the image data are captured over a first range in the predetermined panoramic direction, and (ii) a second overlapping region which overlaps a first overlapping region of a succeeding adjacent piece of the image data, wherein the second overlapping region of the one piece of the image data and the first overlapping region of the succeeding adjacent piece of the image data are captured over a second range in the predetermined panoramic direction;

specifying, for the adjacent pieces of the image data, plural sets of corresponding overlapping regions of the adjacent pieces of the image data as targets for composite processing, wherein said plural sets include a first set comprising the first overlapping region of the one piece of the image data and the corresponding second overlapping region of the preceding adjacent piece of the image data, and a second set comprising the second overlapping region of the one piece of image data and the corresponding first overlapping region of the succeeding adjacent piece of the image data, and wherein, in each of the plural sets, the first and second overlapping regions have respective different luminances;

and combining the plural sets of the corresponding overlapping regions into a piece of panoramic image data.

12. A non-transitory computer readable storage medium having stored therein a program that is executable by a computer of an image processing apparatus, the program being executable by the computer to cause the computer to function as:

an image acquiring section which acquires plural pieces of image data sequentially output by an image capturing section comprising an image sensor, luminances of the plural pieces of image data being changed at predetermined timings such that adjacent pieces of the image data which are adjacent to each other have respective different luminances, wherein the plural pieces of the image data are captured in a single continuous shooting operation during which the image capturing section is moved in a predetermined panoramic direction, and wherein adjacent pieces of the captured image data which are adjacent to each other in the predetermined panoramic direction each include corresponding overlapping regions which are captured over a same range in the predetermined panoramic direction, such that one piece of the image data includes (i) a first overlapping region which overlaps a second overlapping region of a preceding adjacent piece of the image data, wherein the first overlapping region of the one piece of the image data and the second overlapping region of the preceding adjacent piece of the image data are captured over a first range in the predetermined panoramic direction, and (ii) a second overlapping region which overlaps a first overlapping region of a succeeding adjacent piece of the image data, wherein the second overlapping region of the one piece of the image data and the first overlapping region of the succeeding adjacent piece of the image data are captured over a second range in the predetermined panoramic direction;

a specification section which specifies, for the adjacent pieces of the image data, plural sets of corresponding overlapping regions of the adjacent pieces of the image data as targets for composite processing, wherein said plural sets include a first set comprising the first overlapping region of the one piece of the image data and the corresponding second overlapping region of the preceding adjacent piece of the image data, and a second set comprising the second overlapping region of the one piece of image data and the corresponding first overlapping region of the succeeding adjacent piece of the image data, and wherein the first and second overlapping regions in each set have respective different luminances; and a panoramic image composing section which combines the plural sets of the corresponding overlapping regions into a piece of panoramic image data.

\* \* \* \* \*